US011935054B2

(12) United States Patent
Jia et al.

(10) Patent No.: US 11,935,054 B2
(45) Date of Patent: Mar. 19, 2024

(54) SYSTEMS AND METHODS FOR AUTOMATICALLY GENERATING FRAUD STRATEGIES

(71) Applicant: Walmart Apollo, LLC, Bentonville, AR (US)

(72) Inventors: Shihui Jia, Cupertino, CA (US); Hui-Min Chen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 284 days.

(21) Appl. No.: 17/588,862

(22) Filed: Jan. 31, 2022

(65) Prior Publication Data

US 2023/0245122 A1 Aug. 3, 2023

(51) Int. Cl.
| | |
|---|---|
| *G06Q 20/00* | (2012.01) |
| *G06Q 20/02* | (2012.01) |
| *G06Q 20/40* | (2012.01) |
| *G06Q 30/0601* | (2023.01) |

(52) U.S. Cl.
CPC ....... *G06Q 20/4014* (2013.01); *G06Q 20/027* (2013.01); *G06Q 20/4016* (2013.01); *G06Q 30/0609* (2013.01)

(58) Field of Classification Search
None
See application file for complete search history.

(56) References Cited

U.S. PATENT DOCUMENTS

| | | | |
|---|---|---|---|
| 7,707,089 B1 * | 4/2010 | Barton | G06Q 40/03 705/18 |
| 8,885,894 B2 | 11/2014 | Rowen et al. | |
| 10,037,533 B2 | 7/2018 | Caldera | |
| 10,482,542 B1 * | 11/2019 | Jain | G06Q 40/123 |

(Continued)

FOREIGN PATENT DOCUMENTS

CN 110276679 B 5/2021

OTHER PUBLICATIONS

Jha; Fraud Detection and Prevention; ICCMC 2020; pp. 267-274; 2020.*

(Continued)

*Primary Examiner* — Radu Andrei
(74) *Attorney, Agent, or Firm* — Morgan, Lewis & Bockius LLP; Manita Rawat

(57) ABSTRACT

This application relates to systems and methods for automatically generating fraud strategies. A system may comprise customer computing devices, a database, and retailer computing device(s). The retailer computing device(s) are configured to receive data related to customer transactions, calculate a negative reaction score, negative resolution score, anomaly score, and impact score for at least one value of the received data, determine whether the calculated scores are greater than or equal to respective thresholds, identify a value of the received data as a potentially fraudulent data value when one or more of the calculated scores is greater than or equal to its respective threshold, generate an output comprising a list of potentially fraudulent data value(s) and (Continued)

impact scores, identify area(s) of high impact leaks based on the output, and determine which customer computing devices are executing fraudulent transactions based on the identification of areas of high impact leaks.

20 Claims, 4 Drawing Sheets

(56) References Cited

U.S. PATENT DOCUMENTS

| | | | | |
|---|---|---|---|---|
| 10,509,997 | B1* | 12/2019 | Gupta | G06Q 10/00 |
| 10,607,228 | B1* | 3/2020 | Gai | G06N 5/046 |
| 10,621,658 | B1* | 4/2020 | Sahni | G06Q 30/06 |
| 10,692,078 | B1* | 6/2020 | Kuo | G06Q 20/385 |
| 10,937,025 | B1* | 3/2021 | Sahni | G06Q 20/204 |
| 10,997,596 | B1* | 5/2021 | Thomas | G06Q 20/4016 |
| 10,997,654 | B1* | 5/2021 | Sahni | G06Q 40/02 |
| 11,010,468 | B1 | 5/2021 | Katz | |
| 11,276,023 | B1* | 3/2022 | Butler | G06N 20/00 |
| 11,321,777 | B1* | 5/2022 | Gu | G06Q 40/03 |
| 11,354,583 | B2* | 6/2022 | Azizsoltani | G06F 18/22 |
| 11,722,502 | B1* | 8/2023 | Comeaux | G06N 3/086 |
| | | | | 705/318 |
| 2012/0095852 | A1* | 4/2012 | Bauer | G06Q 20/3223 |
| | | | | 705/16 |
| 2012/0143706 | A1* | 6/2012 | Crake | G06Q 20/3227 |
| | | | | 705/18 |
| 2014/0040975 | A1* | 2/2014 | Raleigh | H04L 12/1435 |
| | | | | 726/1 |
| 2014/0283094 | A1* | 9/2014 | Coggeshall | G06Q 10/00 |
| | | | | 726/26 |
| 2014/0310176 | A1* | 10/2014 | Saunders | G06Q 20/405 |
| | | | | 705/44 |
| 2014/0337224 | A1* | 11/2014 | Mohapatra | G06Q 20/24 |
| | | | | 705/44 |
| 2015/0006239 | A1* | 1/2015 | Hoffman | G06Q 10/0635 |
| | | | | 705/7.28 |
| 2015/0019410 | A1* | 1/2015 | Canis | G06Q 20/4016 |
| | | | | 705/39 |
| 2015/0025898 | A1* | 1/2015 | Bazzi | G06Q 10/10 |
| | | | | 705/2 |
| 2015/0081494 | A1* | 3/2015 | Erdelmeier | G06F 21/552 |
| | | | | 705/35 |
| 2015/0235334 | A1* | 8/2015 | Wang | G06F 21/50 |
| | | | | 705/2 |
| 2015/0317633 | A1* | 11/2015 | Saunders | G06Q 20/405 |
| | | | | 705/44 |
| 2016/0044048 | A1* | 2/2016 | Hamidi | H04L 63/1425 |
| | | | | 726/22 |
| 2016/0063645 | A1* | 3/2016 | Houseworth | G06Q 40/123 |
| | | | | 705/31 |
| 2016/0232532 | A1* | 8/2016 | Canis | G06Q 20/4016 |
| 2017/0041759 | A1* | 2/2017 | Gantert | H04W 4/80 |
| 2017/0161745 | A1* | 6/2017 | Hawkins | G06Q 20/3224 |
| 2017/0243221 | A1* | 8/2017 | Gill | G06Q 20/4016 |
| 2017/0270629 | A1* | 9/2017 | Fitzgerald | G06Q 40/123 |
| 2019/0034917 | A1* | 1/2019 | Nolan | G06K 7/10475 |
| 2019/0034919 | A1* | 1/2019 | Nolan | G06Q 20/36 |
| 2019/0034920 | A1* | 1/2019 | Nolan | H04L 9/50 |
| 2019/0034936 | A1* | 1/2019 | Nolan | G06Q 20/42 |
| 2019/0035018 | A1* | 1/2019 | Nolan | G06Q 40/04 |
| 2019/0132336 | A1* | 5/2019 | Sims | H04L 63/1425 |
| 2019/0199720 | A1* | 6/2019 | Palli | H04W 12/08 |
| 2019/0259097 | A1* | 8/2019 | Raleigh | H04M 15/68 |
| 2019/0333141 | A1* | 10/2019 | Bowers | G06Q 30/0201 |
| 2020/0065809 | A1* | 2/2020 | Elfeky | G06Q 20/355 |
| 2020/0175440 | A1* | 6/2020 | Doyle | G06Q 20/208 |
| 2020/0242611 | A1* | 7/2020 | Raman | G06F 18/241 |
| 2020/0242673 | A1* | 7/2020 | Liu | G06N 20/00 |
| 2020/0286102 | A1* | 9/2020 | Raganathan | G06Q 40/03 |
| 2020/0286166 | A1* | 9/2020 | Perkins | G06Q 20/24 |
| 2020/0334779 | A1* | 10/2020 | Meng | G06Q 50/265 |
| 2020/0404966 | A1* | 12/2020 | Pohl | A24F 40/42 |
| 2021/0192292 | A1* | 6/2021 | Zhai | G06N 20/00 |
| 2021/0233081 | A1* | 7/2021 | Harris | G06Q 20/405 |
| 2021/0326904 | A1* | 10/2021 | Palekar | G06N 5/01 |
| 2021/0336955 | A1* | 10/2021 | Huffman | H04L 63/083 |
| 2021/0366586 | A1* | 11/2021 | Ryan | G06Q 20/3224 |
| 2022/0215393 | A1* | 7/2022 | Lenkala | G06Q 20/4015 |
| 2022/0245514 | A1* | 8/2022 | Venkatasubramaniam | |
| | | | | G06N 20/20 |
| 2022/0245643 | A1* | 8/2022 | Venkatasubramaniam | |
| | | | | G06N 3/08 |
| 2022/0245691 | A1* | 8/2022 | Venkatasubramaniam | |
| | | | | G06N 5/01 |
| 2022/0253800 | A1* | 8/2022 | Cooper | G06Q 10/0833 |
| 2022/0269796 | A1* | 8/2022 | Chase | G06F 21/577 |
| 2022/0327547 | A1* | 10/2022 | Ali | G06Q 20/405 |
| 2022/0351207 | A1* | 11/2022 | Hobbs | G06Q 30/0283 |
| 2022/0414665 | A1* | 12/2022 | Gelda | G06N 3/044 |
| 2023/0022070 | A1* | 1/2023 | Zaloum | G06F 3/017 |
| 2023/0027934 | A1* | 1/2023 | Raleigh | H04L 12/1407 |
| 2023/0029312 | A1* | 1/2023 | Paulraj | G06Q 20/4016 |
| 2023/0029777 | A1* | 2/2023 | Abadi | G06Q 20/4016 |
| 2023/0098204 | A1* | 3/2023 | Abadi | G06Q 20/382 |
| | | | | 705/39 |
| 2023/0177513 | A1* | 6/2023 | Townsend | G06Q 20/34 |
| | | | | 705/44 |
| 2023/0177514 | A1* | 6/2023 | Townsend | G06Q 20/4016 |
| | | | | 705/64 |
| 2023/0222178 | A1* | 7/2023 | Singh | G06F 18/40 |
| | | | | 706/45 |
| 2023/0230085 | A1* | 7/2023 | Turgeman | G06Q 20/40145 |
| | | | | 705/44 |
| 2023/0245122 | A1* | 8/2023 | Jia | G06N 20/00 |
| | | | | 705/64 |
| 2023/0298016 | A1* | 9/2023 | Osborn | G06Q 20/4016 |
| | | | | 705/41 |

OTHER PUBLICATIONS

Renjith; Detection of Fraudulent Sellers in Online Marketplaces; IJETT; pp. 48-53; 2018.*

Shen; Selection Policy for Payment Fraud Systems in Retail Banking; Columbia University; 7 pages; 2020.*

* cited by examiner

| Screen Resolution | Impact Score (IS($e_{ij}$)) |
|---|---|
| 1353 x 761 | 0.50 |
| 1024 x 768 | 0.15 |
| 3168 x 1440 | 0.25 |
| 910 x 510 | 0.05 |
| 800 x 600 | 0.10 |

| Device Type | Operating System | Impact Score ($IS(e_{ij}, e_{lk})$) |
|---|---|---|
| Mobile | Windows NT Kernel | 0.50 |
| Mobile | Linux 3.11 and Newer | 0.15 |

SYSTEMS AND METHODS FOR AUTOMATICALLY GENERATING FRAUD STRATEGIES

TECHNICAL FIELD

The disclosure relates generally to systems and methods for automatically generating fraud strategies, and more specifically, generating fraud strategies for online fraud protection.

BACKGROUND

Online retailers encounter many fraudulent transactions each day and require strategies for detecting where and when these fraudulent transactions are occurring in order to prevent financial loss for the retailer. Traditional methods of generating fraud detection strategies require significant manual efforts and human judgment, and often use small sets of static variables that render the search for fraudulent transactions non-comprehensive. Additionally, traditional methods rely on chargeback labels with significant latency (e.g., it can take anywhere from seven days to six months to confirm a fraudulent charge) and depend on the domain expertise of humans who may be biased in selecting variables to be used in developing the fraud strategy. Further, traditional methods utilize a decision tree algorithm with a fixed input from an entire feature space to capture global fraud patterns and generate one rule for detecting fraudulent transactions, which can result in inaccurate and inefficient global fraud strategies (e.g., fraud trends in Florida may be much different from those in Texas). As such, there are opportunities to improve the operational efficiency of fraud strategy generation.

SUMMARY

The embodiments described herein are directed to systems and methods for automatically generating fraud strategies (i.e., fraud trend rules). The present invention provides efficient and accurate systems and methods for automatically generating fraud strategies that enable online retailers to capture typical and emerging fraud trends (e.g., new fraud trends on a retailer's online grocery platform). The invention identifies areas of fraud leaks and generates fraud trend rules specific to those leaks autonomously. The invention also explores a much larger variable space (i.e., up to 1000 variables) than traditional methods (which typically only explore around 20 variables) to be comprehensive. Further, the invention enriches a suspicious fraudulent transaction label with an early negative reaction score, negative resolution score, and anomaly score instead of waiting for a confirmed chargeback to label the transaction, which (as noted above) can take anywhere from seven days to six months to confirm. The invention involves a two-phased approach of first identifying where a fraud leak is happening and then automatically generating a rule specific to the leak. The invention may rely on customer transaction data and a machine learning algorithm to generate sets of subspace-specific rules that can serve as a recommendation engine to users at a retailer (e.g., the retailer's data scientists and other analysts). These subspace-specific rules are much more accurate than rules that attempt to capture a global fraud pattern, which are often too broad.

In accordance with various embodiments, exemplary systems may be implemented in any suitable hardware or hardware and software, such as in any suitable computing device. In some embodiments, a system is provided that comprises a plurality of customer computing devices, a database, and one or more retailer computing devices. Each customer computing device may be configured to execute a customer transaction. The one or more retailer computing devices may be configured to receive data related to a plurality of customer transactions. The data may include one or more of customer computing device information, profile change information, risk rating information, and check flag information for each of the plurality of customer transactions. The one or more retailer computing devices may be further configured to calculate a negative reaction score, a negative resolution score, an anomaly score, and an impact score for at least one value of the respective customer computing device information, the respective profile change information, the respective risk rating information, and the respective check flag information for each of the plurality of customer transactions. The one or more retailer computing devices may be further configured to determine whether the calculated negative reaction score is greater than or equal to a first threshold, whether the calculated negative resolution score is greater than or equal to a second threshold, and whether the calculated anomaly score is equal to a third threshold for each of the plurality of customer transactions. The one or more retailer computing devices may be further configured to identify the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold. The one or more retailer computing devices may be further configured to generate an output comprising a list of one or more identified potentially fraudulent data values and the respective calculated impact score for each identified potentially fraudulent data value. The one or more retailer computing devices may be further configured to identify one or more areas of high impact leaks based on the output. The one or more retailer computing devices may be further configured to determine which of the plurality of customer computing devices are executing fraudulent transactions based on the identification of one or more areas of high impact leaks.

In some embodiments, a method is provided that comprises receiving data related to a plurality of customer transactions. The data may include one or more of customer computing device information, profile change information, risk rating information, and check flag information for each of the plurality of customer transactions. The method may further comprise calculating a negative reaction score, a negative resolution score, an anomaly score, and an impact score for at least one value of the respective customer computing device information, the respective profile change information, the respective risk rating information, and the respective check flag information for each of the plurality of customer transactions. The method may further comprise determining whether the calculated negative reaction score is greater than or equal to a first threshold, whether the calculated negative resolution score is greater than or equal to a second threshold, and whether the calculated anomaly score is equal to a third threshold for each of the plurality of customer transactions. The method may further comprise identifying the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold. The method may further comprise generating an output comprising a list of one or more identified potentially fraudulent data values and the respective calculated impact score for each identified potentially fraudulent data value. The method may further comprise identifying one or more areas of high impact leaks based on the output. The method may further comprise determining which of a plurality of customer computing devices are executing fraudulent transactions based on the identification of one or more areas of high impact leaks.

In some embodiments, a non-transitory computer readable medium has instructions stored thereon, where the instructions, when executed by at least one processor, cause a computing device to perform operations that comprise receiving data related to a plurality of customer transactions. The data may include one or more of customer computing device information, profile change information, risk rating information, and check flag information for each of the plurality of customer transactions. The operations may further comprise calculating a negative reaction score, a negative resolution score, an anomaly score, and an impact score for at least one value of the respective customer computing device information, the respective profile change information, the respective risk rating information, and the respective check flag information for each of the plurality of customer transactions. The operations may further comprise determining whether the calculated negative reaction score is greater than or equal to a first threshold, whether the calculated negative resolution score is greater than or equal to a second threshold, and whether the calculated anomaly score is equal to a third threshold for each of the plurality of customer transactions. The operations may further comprise identifying the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold. The operations may further comprise generating an output comprising a list of one or more identified potentially fraudulent data values and the respective calculated impact score for each identified potentially fraudulent data value. The operations may further comprise identifying one or more areas of high impact leaks based on the output. The operations may further comprise determining which of a plurality of customer computing devices are executing fraudulent transactions based on the identification of one or more areas of high impact leaks.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 3 is a sample output that can be generated by the retailer computing device of FIG. 1 in accordance with some embodiments; and FIG. 4 is a sample output that can be generated by the retailer computing device of FIG. 1 in accordance with some embodiments.

DETAILED DESCRIPTION

Figure 1:
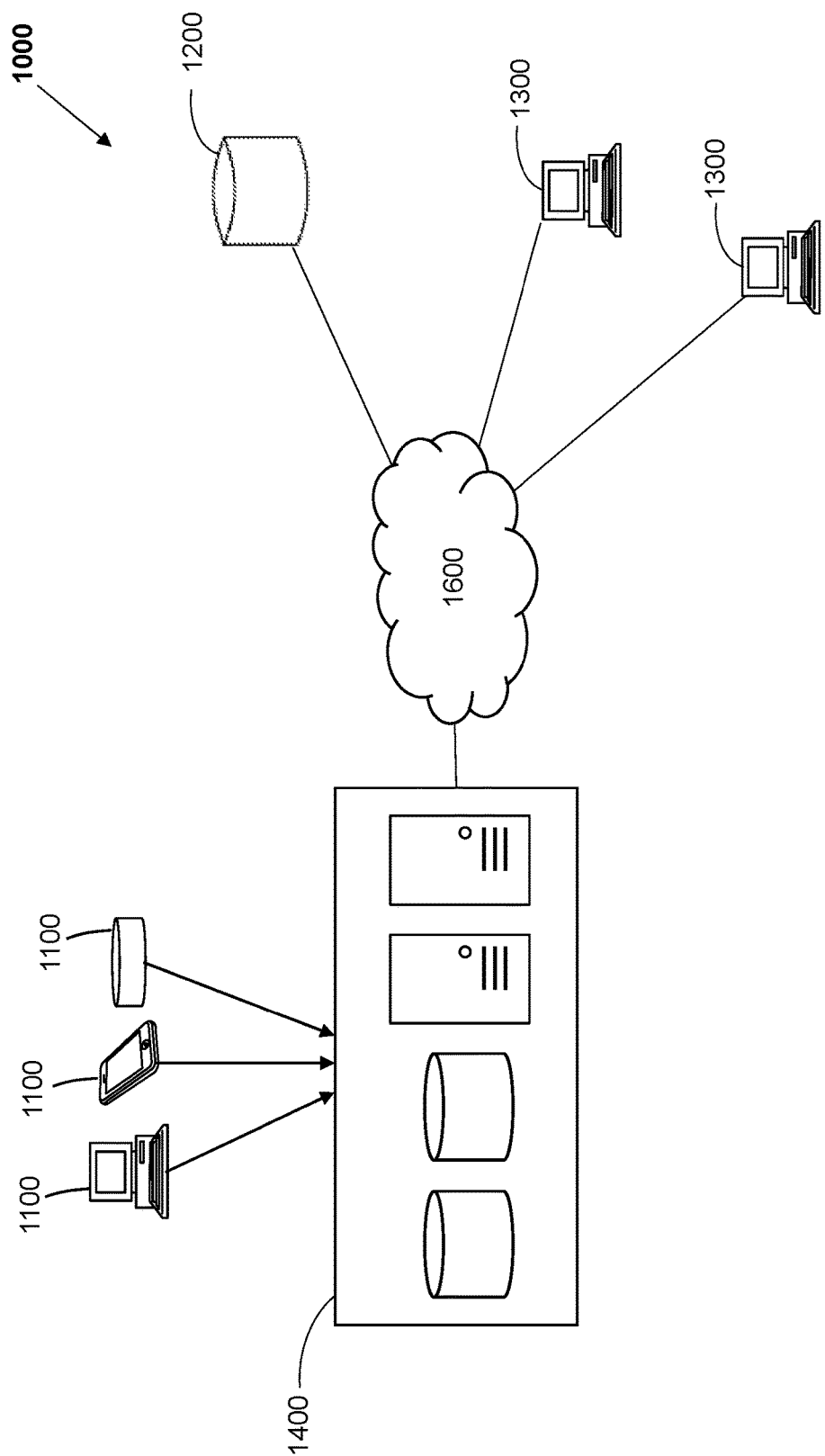
FIG. 1 is a block diagram of a system for automatically generating fraud strategies.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a system 1000 for automatically generating fraud strategies (i.e., fraud trend rules). The system 1000 comprises a plurality of customer computing devices 1100 (e.g., three customer computing devices 1100, as shown in FIG. 1). In some embodiments, the customer computing devices 1100 may include one or more of a desktop, a laptop, a tablet, a smartphone, and a smart speaker. Each of the customer computing devices 1100 is configured to execute a customer transaction (e.g., purchasing a product on a retailer's website). The system 1000 further comprises a database 1200. The system 1000 further comprises one or more retailer computing devices 1300. The system 1000 may further comprise a retailer subsystem 1400, which gathers data from customer computing devices 1100 that execute customer transactions. The retailer subsystem 1400 may contain a plurality of databases and servers for gathering data from customer computing devices 1100. The retailer subsystem 1400, retailer computing devices 1300, and database 1200 may be configured to communicate with one another over a communication network 1600. In some embodiments, the communication network 1600 may be a wireless network.

The one or more retailer computing devices 1300 are configured to receive data ($E_1, E_2, E_3, E_4, \ldots E_n$) related to a plurality of customer transactions. The data includes one or more of customer computing device information ($E_1$), profile change information ($E_2$), risk rating information ($E_3$), and check flag information ($E_4$) for each of the plurality of customer transactions. The data may also include one or more of: information on the item(s) purchased, account information, shopping history information, number of customers using the same credit card, number of customers using the same billing or shipping address. The data may also include other values that a domain expert deems relevant. In some embodiments, the customer computing device information includes one or more of: a browser language used on the customer computing device 1100, an operating system used on the customer computing device 1100, and a screen resolution of the customer computing device 1100. In some embodiments, profile change information includes one or more of: indication of a recently changed payment method and indication of a recently changed delivery address. In some embodiments, risk rating information comprises a risk rating based on historical customer transaction data. In some embodiments, the risk rating may be internally developed by the retailer. For example, the retailer may assign a higher risk rating to a transaction within the jewelry department than to a transaction within the fruit department. A retailer may also assign a high risk rating to a transaction with more authentication errors, and the retailer may assign a low risk rating to a transaction with fewer authentication errors. In some embodiments, check flag information includes one or more of: an indication of a mismatch between a billing zip code and a shipping zip code and an indication of a mismatch between a billing name and a shipping name.

The one or more retailer computing devices 1300 are further configured to calculate a negative reaction score ($s_1(e_{ij})$), a negative resolution score ($s_2(e_{ij})$), an anomaly score ($s_3(e_{ij})$), and an impact score ($IS(e_{ej})$) for at least one value of the respective customer computing device information, the respective profile change information, the respective risk rating information, and the respective check flag information for each of the plurality of customer transactions. A high negative reaction score is indicative of fraudulent transactions. For example, if an online retailer declines 1% of transactions on average but the online retailer is declining 20% of transactions for a particular screen resolution (e.g., 1353×761), the negative reaction score for that screen resolution will be high and indicative of fraudulent transactions. If there are 100 orders from a particular screen resolution (e.g., 1353×761), and 20 of the orders are denied or challenged and 80 of the orders are accepted, the negative reaction score for the particular screen resolution would be 0.2. A high negative resolution score is indicative of fraudulent transactions. For example, if a large number of early chargebacks are indicated by a human (e.g., a customer or third party vendor) for transactions that took place on a device with a particular screen resolution (e.g., 1353×761), the negative resolution score may be high and indicative of fraudulent transactions. If there are 100 orders from a particular screen resolution (e.g., 1353×761), and 20 of the orders received an early chargeback indication and 80 of the orders did not, the negative resolution score for the particular screen resolution would be 0.2. The anomaly score may be an anomaly score within an isolation forest. An anomaly score may be assigned to each transaction, where an anomaly score of −1 is assigned to anomalies and an anomaly score of 1 is assigned to normal transactions. For example, if a customer transaction involved the purchase of multiple high performance vehicle tires via a smart speaker, that type of customer computing device 1100 would receive an anomaly score of −1 because a customer making a purchase like that typically does not make the purchase via a smart speaker. In another example, the anomaly score may be −1 if the retailer usually receives 10 tire sale transactions with a particular screen resolution (e.g., 1353×761) over a 24 hour period, but on one day, the retailer receives 100 tire sale transactions with that screen resolution. An anomaly score of −1 is indicative of fraudulent transactions. The negative reaction score ($s_1(e_{ij})$), negative resolution score ($s_2(e_{ij})$), and an anomaly score ($s_3(e_{ij})$) each provide an accurate indication of whether a transaction is fraudulent and enable early labeling of suspicious fraudulent transactions within an online retailer subspace.

The impact score measures potential loss if the retailer does not mitigate a particular trend. The impact scores provide a ranking of which data values that the retailer should address first as areas of potential fraud leaks. FIG. 3 (described in detail below) illustrates a sample output 3000 including impact scores ($IS(e_{ij})$) associated with various screen resolution data values. The impact score is indicative of how much money the retailer will likely lose if they do not take any action to address a fraud leak, so a retailer would want to address the data values in output 3000 associated with a higher impact score before those associated with a lower impact score in order to mitigate the retailer's financial losses due to a fraud leak. In some embodiments, the one or more retailer computing devices 1300 are further configured to calculate the negative reaction score ($s_1(e_{ij}, e_{lk})$), the negative resolution score ($s_2(e_{ij}, e_{lk})$), the anomaly score ($s_3(e_{ij}, e_{lk})$), and the impact score ($IS(e_{ij}, e_{lk})$) for at least two values of the respective customer computing device information, the respective profile change information, the respective risk rating information, and the respective check flag information for each of the plurality of customer transactions. In some embodiments, the at least two values may be credit card type and browser language. In some embodiments, the at least two values may be device type and operating system type. FIG. 4 illustrates a sample output 4000 including impact scores ($IS(e_{ij}, e_{lk})$) associated with various pairs of device type and operating system type. Like in FIG. 3, the retailer would want to address the data values in output 4000 associated with the higher impact score first in order to mitigate the retailer's financial losses due to a fraud leak.

The one or more retailer computing devices 1300 are further configured to determine whether the calculated negative reaction score is greater than or equal to a first threshold (e.g., $s_1(e_{ij}) \geq 0.15$ or $s_1(e_{ij}, e_{lk}) \geq 0.15$), whether the calculated negative resolution score is greater than or equal to a second threshold (e.g., $s_2(e_{ij}) \geq 0.15$ or $s_2(e_{ij}, e_{lk}) \geq 0.15$), and whether the calculated anomaly score is equal to a third threshold (e.g., $s_3(e_{ij}) = -1$ or $s_3(e_{ij}, e_{lk}) = -1$) for each of the plurality of customer transactions. For example, if transactions involving a particular screen resolution (e.g., 1353×761) get rejected 20% of the time (i.e., $s_1(e_{ij}) = 0.20$), the one or more retailer computing devices 1300 may determine that the calculated negative reaction score is greater than a first threshold (e.g., $s_1(e_{ij}) \geq 0.15$). In some embodiments, the first threshold and the second threshold may be the same. The retailer may customize the first threshold, the second threshold, and the third threshold, and the various thresholds may change over time.

The one or more retailer computing devices 1300 are further configured to identify the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold. For example, if the one or more retailer computing devices 1300 calculate that $s_1(e_{ij}) \geq 0.15$ or $s_2(e_{ij}) \geq 0.15$ or $s_3(e_{ij}) = -1$ for a particular screen resolution (e.g., 1353×761), the one or more retailer computing devices 1300 may identify that screen resolution as a potentially fraudulent data value within a relevant retailer subspace (e.g., online grocery transactions). In another example, if the one or more retailer computing devices 1300 calculate that $s_1(e_{ij}, e_{lk}) \geq 0.15$ or $s_2(e_{ij}, e_{lk}) \geq 0.15$ or $s_3(e_{ij}, e_{lk}) = -1$ for a particular device type and operating system type, the one or more retailer computing devices 1300 may identify that pair of device type and operating system type (e.g., mobile and Windows NT Kernel) as a potentially fraudulent combination of data values within a relevant retailer subspace.

The one or more retailer computing devices 1300 are further configured to generate an output (e.g., output 3000 in FIG. 3 or output 4000 in FIG. 4) comprising a list of one or more identified potentially fraudulent data values and the respective calculated impact score for each identified potentially fraudulent data value. The list may be a risk entities list for a particular retailer subspace (e.g., online grocery transactions). FIG. 3 illustrates a sample output 3000 that can be generated by the one or more retailer computing devices 1300. The sample output 3000 comprises a list of identified potentially fraudulent screen resolution values and the accompanying impact score ($IS(e_{ij})$) for each screen resolution value. Those screen resolution values associated with higher impact scores should be addressed first by the retailer to prevent financial loss due to fraudulent transactions involving the identified screen resolutions. FIG. 4 is a sample output 4000 that can be generated by the one or more retailer computing devices 1300. The sample output 4000 comprises a list of identified potentially fraudulent types of customer computing devices 1100 and types of operating systems used on the customer computing devices 1100 and the accompanying impact score ($IS(e_{ij}, e_{lk})$) for each pair of device type and operating system type. The pairs of device type and operating system type associated with the highest impact score should be addressed first by the retailer to prevent financial loss due to fraudulent transactions involving the identified pairs of device type and operating system type.

The one or more retailer computing devices 1300 are further configured to identify one or more areas of high impact leaks based on the output for a particular retailer subspace (e.g., online grocery transactions). For example, the one or more retailer computing devices 1300 may identify that transactions in a retailer's online grocery subspace involving customer computing devices 1100 with screen resolutions of 1353×761 are an area of high impact leaks based on output 3000 where $IS(e_{ij})=0.50$. The one or more retailer computing devices 1300 are further configured to determine which of the plurality of customer computing devices 1100 are executing fraudulent transactions based on the identification of one or more areas of high impact leaks. For example, the one or more retailer computing devices 1300 may determine that a customer computing device 1100 with a screen resolution of 1353×761 is executing a fraudulent online grocery purchase based on the identification of screen resolutions of 1353×761 in the online grocery subspace as an area of high impact leaks. In some embodiments, the one or more retailer computing devices 1300 are further configured to generate a plurality of area-specific rules for the one or more areas of high impact leaks. For example, the one or more retailer computing devices 1300 may generate a rule that declines (or requires further inspection of) any online grocery purchase originating from a customer computing device 1100 that has a screen resolution of 1353×761. Another exemplary rule may be one specific to the tire department, and the rule may decline transactions that involve the purchase of high performance vehicle tires via a smart speaker. In some embodiments, the one or more retailer computing devices 1300 are further configured to identify the top two most precise rules of the plurality of area-specific rules and send the top two most precise rules to one or more of the database 1200 and one or more additional retailer computing devices 1300. A user (e.g., a data scientist employed by the retailer) may access the rules from database 1200 or retailer computing device(s) 1300 and push the rules to production on an online retailer platform so that the retailer can use the rules to efficiently and accurately identify fraudulent transactions within a subspace of the online retailer platform.

In some embodiments, the one or more retailer computing devices 1300 may apply a machine learning algorithm (e.g., a decision rules learning algorithm) to the output (e.g., output 3000 or output 4000) to generate top sets of impactful and highly accurate area-specific rules for the one or more areas of high impact leaks. The machine learning algorithm may generate a first set of logical rules, then narrow down the set of logical rules using performance filtering (e.g., a precision threshold and a recall threshold) to generate a set of high-performing rules, and finally de-duplicate the set of high-performing rules to output a set of high-performing and diversified-by-design rules.

Figure 2:
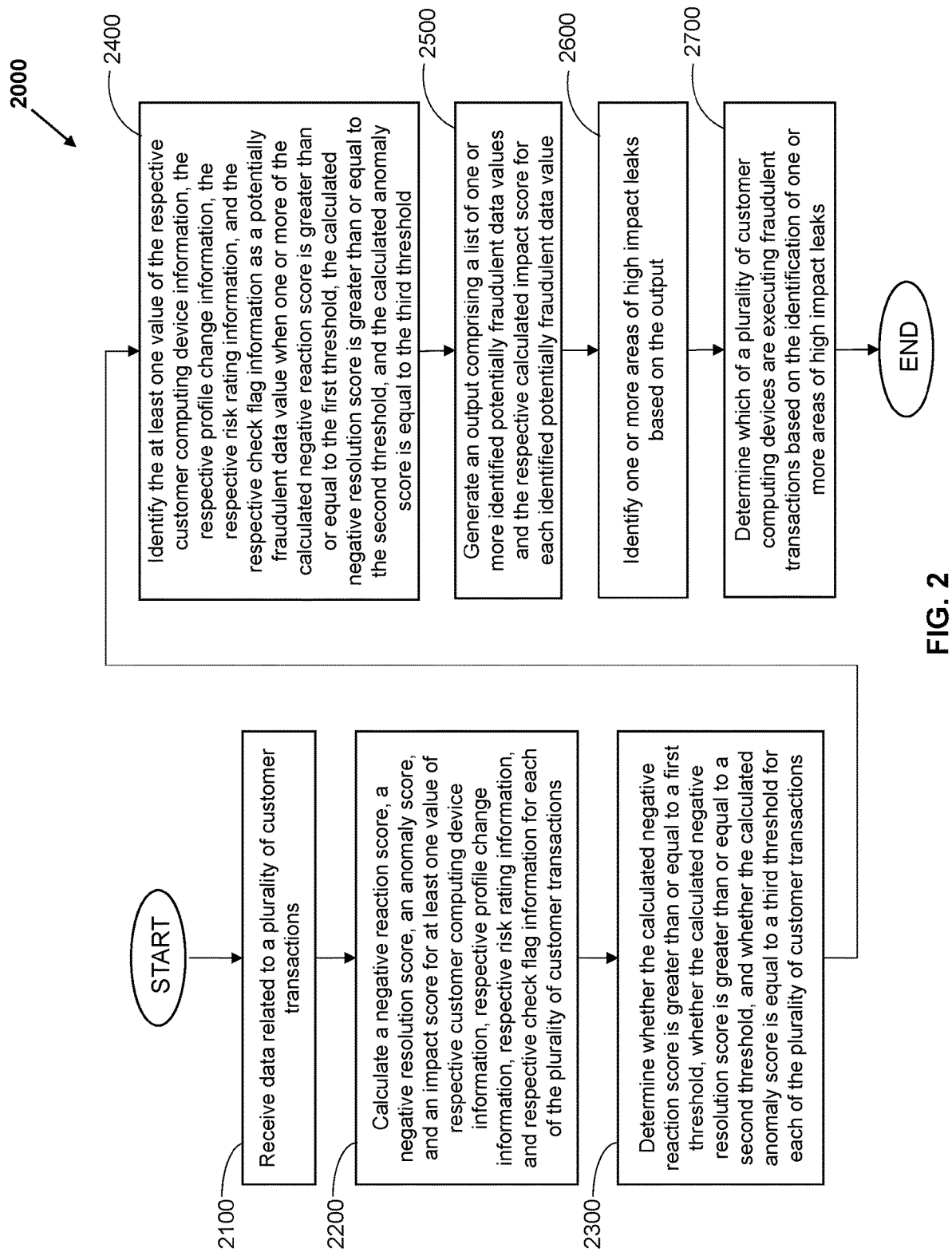
FIG. 2 is a flowchart of an example method that can be carried out by the retailer computing device of FIG. 1 in accordance with some embodiments.

FIG. 2 is a flowchart of an example method 2000 for automatically generating fraud strategies (i.e., fraud trend rules) that can be carried out by a retailer computing device 1300. Beginning at step 2100, a computing device, such as retailer computing device 1300, receives data related to a plurality of customer transactions. The data includes one or more of customer computing device information, profile change information, risk rating information, and check flag information for each of the plurality of customer transactions (described in detail above with respect to FIG. 1). In some embodiments, the customer computing device information includes one or more of: a browser language used on the customer computing device 1100, an operating system used on the customer computing device 1100, and a screen resolution of the customer computing device 1100.

At step 2200, the computing device (e.g., retailer computing device 1300) calculates a negative reaction score ($s_1(e_{ij})$), a negative resolution score ($s_2(e_{ij})$), an anomaly score ($s_3(e_{ij})$), and an impact score ($IS(e_{ij})$) for at least one value of the respective customer computing device information, the respective profile change information, the respective risk rating information, and the respective check flag information for each of the plurality of customer transactions (described in detail above with respect to FIG. 1). In some embodiments, the anomaly score is limited to a score within an isolation forest. In some embodiments, method 2000 may further include a step where the computing device (e.g., retailer computing device 1300) calculates the negative reaction score ($s_1(e_{ij}, e_{lk})$), the negative resolution score ($s_2(e_{ij}, e_{lk})$), the anomaly score ($s_3(e_{ij}, e_{lk})$), and the impact score ($IS(e_{ij}, e_{lk})$) for at least two values of the respective customer computing device information, the respective profile change information, the respective risk rating information, and the respective check flag information for each of the plurality of customer transactions (described in detail above with respect to FIG. 1).

Proceeding to step 2300, the computing device (e.g., retailer computing device 1300) determines whether the calculated negative reaction score is greater than or equal to a first threshold (e.g., $s_1(e_{ij}) \geq 0.15$ or $s_1(e_{ij}, e_{lk}) \geq 0.15$), whether the calculated negative resolution score is greater than or equal to a second threshold (e.g., $s_2(e_{ij}) \geq 0.15$ or $s_2(e_{ij}, e_{lk}) \geq 0.15$), and whether the calculated anomaly score is equal to a third threshold (e.g., $s_3(e_{ij}) = -1$ or $s_3(e_{ij}, e_{lk}) = -1$) for each of the plurality of customer transactions (described in detail above with respect to FIG. 1).

At step 2400, the computing device (e.g., retailer computing device 1300) identifies the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold (described in detail above with respect to FIG. 1).

Proceeding to step 2500, the computing device (e.g., retailer computing device 1300) generates an output (e.g., output 3000 in FIG. 3 or output 4000 in FIG. 4) comprising a list of one or more identified potentially fraudulent data values and the respective calculated impact score for each identified potentially fraudulent data value (described in detail above with respect to FIG. 1, FIG. 3, and FIG. 4).

At step 2600, the computing device (e.g., retailer computing device 1300) identifies one or more areas of high impact leaks based on the output (e.g., output 3000 in FIG. 3 or output 4000 in FIG. 4) (described in detail above with respect to FIG. 1, FIG. 3, and FIG. 4). At step 2700, the computing device (e.g., retailer computing device 1300) determines which of a plurality of customer computing devices (e.g., customer computing devices 1100) are executing fraudulent transactions based on the identification of one or more areas of high impact leaks (described in detail above with respect to FIG. 1). The method 2000 then ends.

In some embodiments, method 2000 may further include a step where the computing device (e.g., retailer computing device 1300) generates a plurality of area-specific rules for the one or more areas of high impact leaks. In some embodiments, method 2000 may further include a step where the computing device (e.g., retailer computing device 1300) identifies the top two most precise rules of the plurality of area-specific rules. In some embodiments, method 2000 may further include a step where the computing device (e.g., retailer computing device 1300) sends the top two most precise rules to one or more of a database (e.g., database 1200) and one or more retailer computing devices (e.g., retailer computing devices 1300).

Although the methods described above are with reference to the illustrated flowchart, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods (e.g., method 2000) may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
  a plurality of customer computing devices, wherein each customer computing device is configured to execute a customer transaction;
  a database; and
  one or more retailer computing devices, wherein the one or more retailer computing devices are configured to:
    receive data related to a plurality of customer transactions, wherein the data includes one or more of customer computing device information, profile change information, risk rating information, and check flag information for each of the plurality of customer transactions;
    calculate a negative reaction score, a negative resolution score, an anomaly score, and an impact score for at least one value of the respective customer computing device information, the respective profile change information, the respective risk rating information, and the respective check flag information for each of the plurality of customer transactions;
    determine whether the calculated negative reaction score is greater than or equal to a first threshold, whether the calculated negative resolution score is greater than or equal to a second threshold, and whether the calculated anomaly score is equal to a third threshold for each of the plurality of customer transactions;
    identify the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold;
    generate an output comprising a list of one or more identified potentially fraudulent data values and the respective calculated impact score for each identified potentially fraudulent data value;
    identify one or more areas of high impact leaks based on the output; and
    determine which of the plurality of customer computing devices are executing fraudulent transactions based on the identification of one or more areas of high impact leaks.

2. The system of claim 1, wherein the one or more retailer computing devices are further configured to:
calculate the negative reaction score, the negative resolution score, the anomaly score, and the impact score for at least two values of the respective customer computing device information, the respective profile change information, the respective risk rating information, and the respective check flag information for each of the plurality of customer transactions.

3. The system of claim 1, wherein the customer computing device information includes one or more of: a browser language used on the customer computing device, an operating system used on the customer computing device, and a screen resolution of the customer computing device.

4. The system of claim 1, wherein the profile change information includes one or more of: a recently changed payment method and a recently changed delivery address.

5. The system of claim 1, wherein the risk rating information comprises a risk rating based on historical customer transaction data.

6. The system of claim 1, wherein the check flag information includes one or more of: an indication of a mismatch between a billing zip code and a shipping zip code and an indication of a mismatch between a billing name and a shipping name.

7. The system of claim 1, wherein the one or more retailer computing devices are further configured to:
generate a plurality of area-specific rules for the one or more areas of high impact leaks.

8. The system of claim 7, wherein the one or more retailer computing devices are further configured to:
identify the top two most precise rules of the plurality of area-specific rules; and
send the top two most precise rules to one or more of the database and one or more additional retailer computing devices.

9. A method comprising the steps of:
receiving data related to a plurality of customer transactions, wherein the data includes one or more of customer computing device information, profile change information, risk rating information, and check flag information for each of the plurality of customer transactions;
calculating a negative reaction score, a negative resolution score, an anomaly score, and an impact score for at least one value of the respective customer computing device information, the respective profile change information, the respective risk rating information, and the respective check flag information for each of the plurality of customer transactions;
determining whether the calculated negative reaction score is greater than or equal to a first threshold, whether the calculated negative resolution score is greater than or equal to a second threshold, and whether the calculated anomaly score is equal to a third threshold for each of the plurality of customer transactions;
identifying the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold;
generating an output comprising a list of one or more identified potentially fraudulent data values and the respective calculated impact score for each identified potentially fraudulent data value;
identifying one or more areas of high impact leaks based on the output; and
determining which of a plurality of customer computing devices are executing fraudulent transactions based on the identification of one or more areas of high impact leaks.

10. The method of claim 9, wherein the customer computing device information includes one or more of: a browser language used on the customer computing device, an operating system used on the customer computing device, and a screen resolution of the customer computing device.

11. The method of claim 9, further comprising:
generating a plurality of area-specific rules for the one or more areas of high impact leaks.

12. The method of claim 11, further comprising:
identifying the top two most precise rules of the plurality of area-specific rules.

13. The method of claim 12, further comprising:
sending the top two most precise rules to one or more of a database and one or more retailer computing devices.

14. The method of claim 9, wherein the anomaly score is limited to a score within an isolation forest.

15. The method of claim 9, further comprising:
calculating the negative reaction score, the negative resolution score, the anomaly score, and the impact score for at least two values of the respective customer computing device information, the respective profile change information, the respective risk rating information, and the respective check flag information for each of the plurality of customer transactions.

16. A non-transitory computer readable medium having instructions stored thereon, wherein the instructions, when executed by at least one processor, cause a computing device to perform operations comprising:
receiving data related to a plurality of customer transactions, wherein the data includes one or more of customer computing device information, profile change information, risk rating information, and check flag information for each of the plurality of customer transactions;
calculating a negative reaction score, a negative resolution score, an anomaly score, and an impact score for at least one value of the respective customer computing device information, the respective profile change information, the respective risk rating information, and the respective check flag information for each of the plurality of customer transactions;
determining whether the calculated negative reaction score is greater than or equal to a first threshold, whether the calculated negative resolution score is greater than or equal to a second threshold, and whether the calculated anomaly score is equal to a third threshold for each of the plurality of customer transactions;
identifying the at least one value of the respective customer computing device information, the respective profile change information, the respective risk rating information, and the respective check flag information as a potentially fraudulent data value when one or more of the calculated negative reaction score is greater than or equal to the first threshold, the calculated negative resolution score is greater than or equal to the second threshold, and the calculated anomaly score is equal to the third threshold;

generating an output comprising a list of one or more identified potentially fraudulent data values and the respective calculated impact score for each identified potentially fraudulent data value;

identifying one or more areas of high impact leaks based on the output; and determining which of a plurality of customer computing devices are executing fraudulent transactions based on the identification of one or more areas of high impact leaks.

17. The non-transitory computer readable medium of claim 16, further comprising instructions stored thereon that, when executed by the at least one processor, further cause the computing device to perform operations comprising:

generating a plurality of area-specific rules for the one or more areas of high impact leaks.

18. The non-transitory computer readable medium of claim 17, further comprising instructions stored thereon that, when executed by the at least one processor, further cause the computing device to perform operations comprising:

identifying the top two most precise rules of the plurality of area-specific rules; and sending the top two most precise rules to one or more of a database and one or more retailer computing devices.

19. The non-transitory computer readable medium of claim 16, wherein the anomaly score is limited to a score within an isolation forest.

20. The non-transitory computer readable medium of claim 16, further comprising instructions stored thereon that, when executed by the at least one processor, further cause the computing device to perform operations comprising:

calculating the negative reaction score, the negative resolution score, the anomaly score, and the impact score for at least two values of the respective customer computing device information, the respective profile change information, the respective risk rating information, and the respective check flag information for each of the plurality of customer transactions.

* * * * *